May 25, 1954   M. S. DE FRANCISCO   2,679,197
PHOTOGRAPHIC DEVICE
Filed Feb. 18, 1952   2 Sheets-Sheet 1
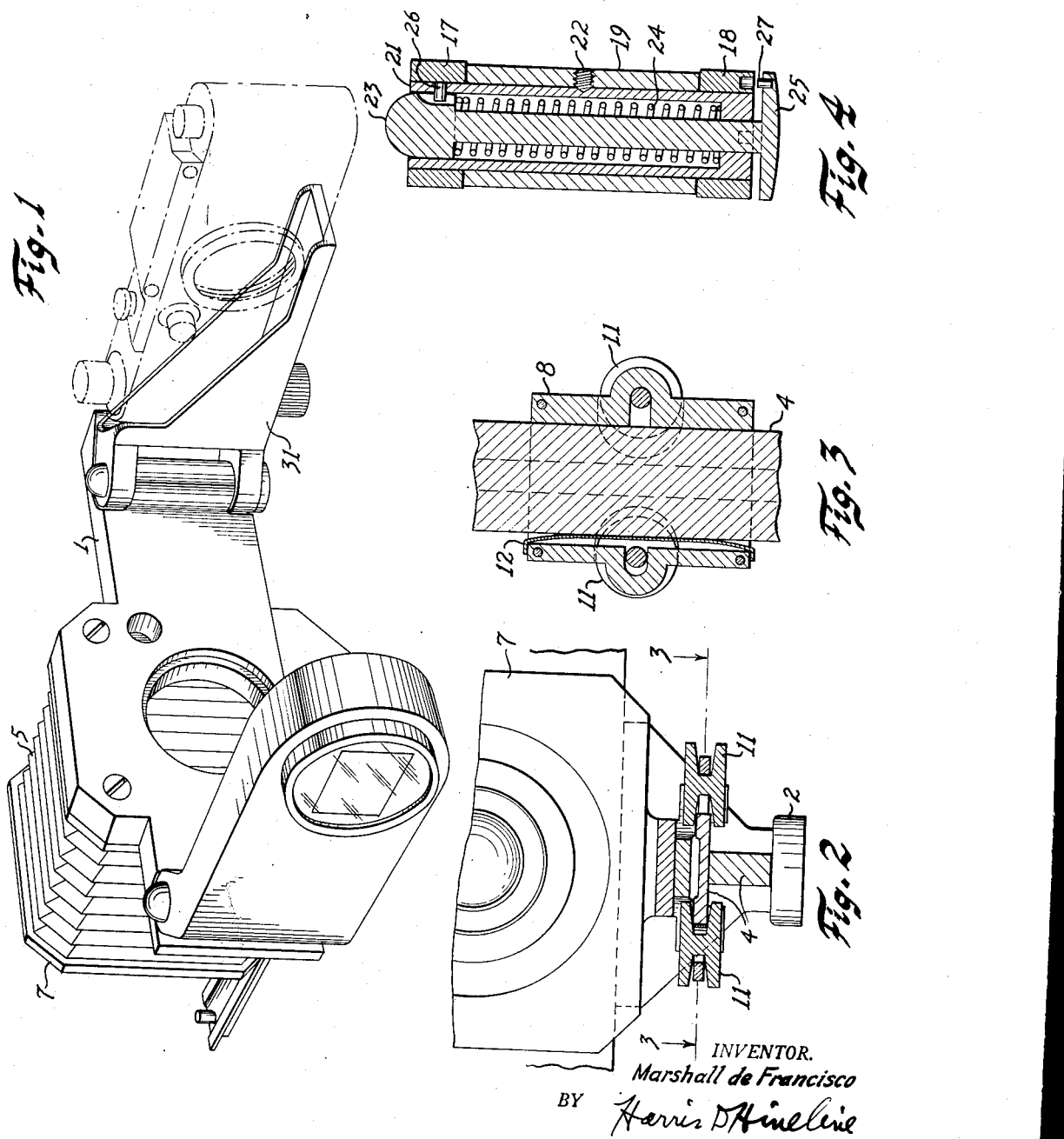
INVENTOR.
Marshall de Francisco
BY Harris D Hineline
ATTORNEY May 25, 1954   M. S. DE FRANCISCO   2,679,197
PHOTOGRAPHIC DEVICE
Filed Feb. 18, 1952   2 Sheets-Sheet 2
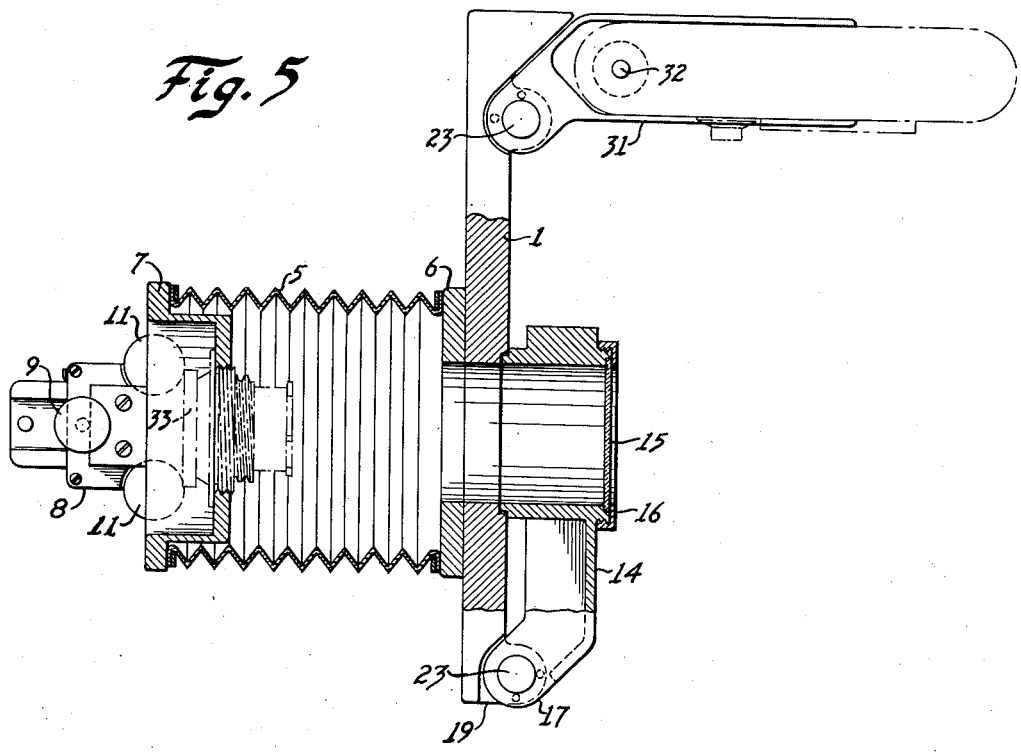
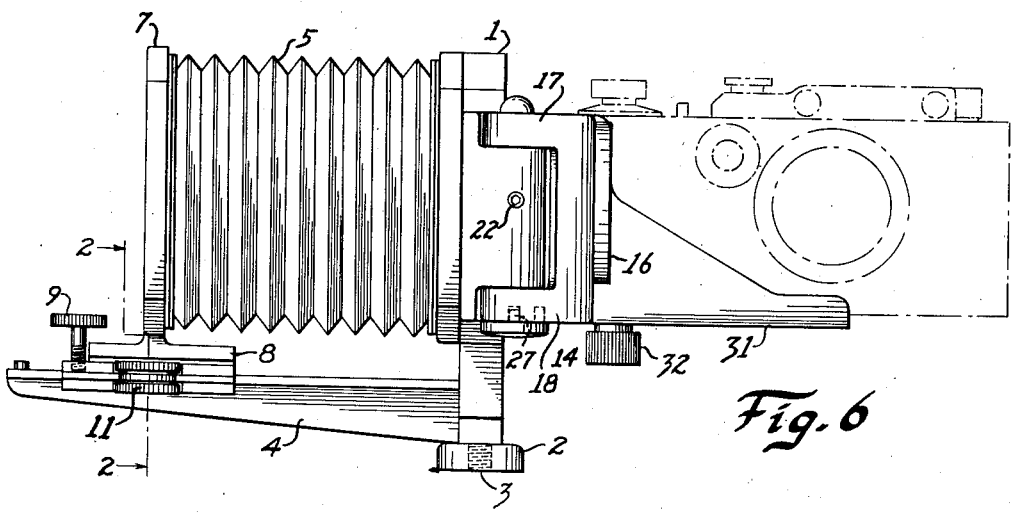
INVENTOR.
Marshall de Francisco
BY Harris D. Hineline
ATTORNEY Patented May 25, 1954

2,679,197

UNITED STATES PATENT OFFICE 2,679,197

PHOTOGRAPHIC DEVICE

Marshall S. De Francisco, Brooklyn, N. Y.

Application February 18, 1952, Serial No. 272,121

2 Claims. (Cl. 95—44)

This invention relates to photographic apparatus, relates particularly to a focusing holder for a miniature camera, and relates particularly to a frame with attached bellows and lens carrier having hinged thereto swinging carriers for a miniature camera and a focusing screen.

The miniature cameras using motion picture film for a picture sighting about twice the size of the motion picture frame have become very popular, and for many purposes they are highly efficient. However, the use of roll film and a focal plane shutter makes focusing on a focusing screen impossible. In addition, the lens extension ordinarily is not sufficient to focus on anything closer than several feet, for which reason the ordinary miniature camera is not adapted to making pictures of small objects, or for copying, or the like.

The present invention provides a holder for a miniature camera in which there is provided a main frame which can be carried on a tripod with a swinging holder on one side within which the miniature camera, minus its lens, is seated, swingable against an opening in the main frame, with a second hinged frame carrying a focusing glass adjusted to such a position that the ground glass focusing screen when folded up against the opening in the frame occupies exactly the same plane as the sensitive emulsion layer on the film. On the other side of the main frame there is provided a bellows and a movable lens carrier, the normal lens of the miniature camera being mounted in the lens carrier.

By the structure of the present invention, it is thus possible to mount a lens in an adjustable carrier, focus it upon a movable focusing screen, then substitute the camera and film for the focusing screen to make a normal exposure on the focused image. Other objects and details of the invention will be apparent from the following description when read in connection with the accompanying drawings, in which Fig. 1 is a perspective view of the main frame, bellows, focusing screen, camera holder, and camera;

Fig. 2 is a vertical view partly in section of the lens, lens holder, lens holder rail, and focusing control;

Fig. 3 is a top view in section of the carrier rail and focusing means;

Fig. 4 is a view in vertical section of a locking hinge of the type used for both the camera holder and the focusing screen holder;

Fig. 5 is a top view partly in section of the main frame, bellows, lens holder, and focusing screen in place before the lens; and Fig. 6 is a side view of the main frame, carrier rail, lens holder, focusing screen, and camera.

Referring to the figures, there is provided a main frame member 1 which is substantially a flat plate having a boss 2 threaded at 3 to receive a tripod screw and having in addition a carrier rail member 4. Upon the front side of the plate member 1 there is provided a camera bellows 5 which may be attached to a plate member 6 which in turn is attached to the plate 1; or the bellows may be attached directly to the plate 1 as desired. There is also provided a lens carrier member 7 to which the front end of the bellows 5 is attached, as shown in Fig. 5. At the bottom of the member 7 there is provided a slider member 8 adapted to cooperate with the carrier member 4. The slider 8 may be equipped, if desired, with a locking screw 9 and with knurled tractor members 11. The slider 8 is preferably held snugly to the carrier rail 4 by a stiff spring 12, as shown in Fig. 3. It will be noted from Fig. 2 that the tractor members 11 are made with a tapered or narrowed groove which grips the edges of the carrier rail 4 sufficiently snugly to permit of easy operation of the slider 8 merely by pushing or pulling on the outer periphery of the members 11.

At the left hand end of the plate member 1 there is hinged a frame member 14 having an opening therethrough as shown and a focusing screen 15 at the rear edge thereof. The focusing screen may preferably be a disk of ground glass, but any other suitable material may be used. This structure is particularly well shown in Fig. 5. The focusing screen 15 is conveniently held in place by a collar ring 16, and it is convenient to adjust the position of the focusing screen 15 by the use of annular rings or shims between the focusing screen 15 and the carrier frame 14.

The frame 14 is conveniently hinged onto the main plate 1 by a hinge structure of the type shown in Fig. 4. In this structure the member 14 has an upper hinge portion 17 and a lower hinge portion 18 and the main plate 1 has a hinge extension 19, as shown in Figs. 4 and 6. A sleeve member 21 passes through all three of the hinge portions as shown in Fig. 4 and is held in place by a set screw 22. Within the sleeve 21 there is positioned a locking pin member 23 and a spring member 24. The upper end of the pin 23 has a recessed head as shown, and the lower end of the pin 23 has a button 25, also as shown in Fig. 4. The pin 23 is prevented from turning with respect to the frame 1 by a pin member 26, but it can be depressed against the pressure of the spring 24 by a finger applied to the upper end. A second pin member 27 is provided which will lock the pin in place when it is raised by the spring 24. The pin 27 enters into one or the other of two holes in the lower hinge member 18.

To the righthand end of the main plate 1 there is hinged a camera carrier 31 using the same type of hinge structure as used in connection with the frame 41. The carrier member 31 is made in the form of a trough, as is particularly well shown in Fig. 1, into which the camera is snugly inserted and held in place by a "tripod" type of holding screw 32. This structure also swings readily, smoothly, and accurately between a position well removed from the lens opening in the base plate 1 to a position against the base plate 1 alternatively with the member 14. It will be noticed from Fig. 5 that the lens opening in the plate 1 is recessed to take the outer rim of the lens mounted in the camera to make a light-tight closure.

The lens carrier 7 is provided with a threaded opening into which the regular camera lens 32 may be screwed, as is shown in dotted lines in Fig. 5.

In the operation of this device the miniature camera is separated from its lens, mounted in the trough member 31, and held in place by the clamp screw 32. At the same time, the separated lens member is screwed into the lens carrier 7. Before seating the camera in the trough of the member 31, it is desirably charged with film since it is more convenient to load film with the camera out of the trough than in it, especially with those cameras in which the whole back is removed. The pin member 23 on the lefthand hinge may then be depressed and the focusing screen frame swung into place in contact with the plate member 1 and locked therein by the hinge pin 23 and its associated members. The main frame 1 may then be positioned on any convenient support, preferably a tripod type of support with a screw entering the tripod screw opening 3. Since miniature camera lenses do not as a rule have a shutter, light is immediately available through the lens 32 onto the focusing screen 16. The tractor members 11 may be grasped by the operator's thumb and finger and the slider 8 moved inward or outward until an approximate focus is obtained. The plate member 1 may then be adjusted on its carrying tripod to bring exactly the desired subject matter onto the focusing screen 15 in properly centered position. Final focusing may then be accomplished by careful movement of the slider 8, after which the slider may be clamped in place by the screw member 9. When this stage is reached, the focusing screen may be removed by depressing the pin 23 and swinging the frame 14 away from the plate 1. Thereafter, the righthand pin 23 may be depressed, freeing the frame 31 and permitting the camera body to be swung into contact with the plate member 1, whereupon the exposure may be made by the focal plane shutter in the usual way. The camera may then be swung away from the main plate and the focusing screen returned in preparation for subsequent exposures.

By the construction herein disclosed there is provided a main frame having an opening therein with which there may be registered, alternatively, a focusing screen or a camera body, together with bellows, lens carrier slider rail, and focus adjusting means to bring a lens into accurate focusing position between the focusing screen and an object to be photographed, together with a swingable camera carrier to be substituted for the focusing screen.

While there is above disclosed but a single embodiment of the structure and process of the invention, it is possible to provide still other embodiments without departing from the inventive concept herein disclosed, and it is therefore desired that only such limitations be imposed on the appended claims as are stated therein or required by the prior art.

The invention claimed is:

1. A camera structure comprising a main frame having an opening therein, a bellows member attached to one side of said frame, approximately coaxial with said opening, a carrier rail attached to said main frame, a slider thereon, a lens carrier attached to said slider and to said bellows, a focusing screen pivotally mounted on one end of said main frame adapted to cooperate with said opening therein, and a camera carrier positioned on the other end of said frame adapted to bring a camera into register with said opening, the said slider comprising a grooved portion, an opposing spring, and a pair of rollers journaled in said slider having tapered annular recesses cooperating with said rail, the outer periphery of each thereof being exposed to traction by a user's fingers.

2. A camera structure comprising a main frame having an opening therein, a bellows member attached to one side of said frame, approximately coaxial with said opening, a carrier rail attached to said main frame, a slider thereon, a lens carrier attached to said slider and to said bellows, a focusing screen pivotally mounted on one end of said main frame adapted to cooperate with said opening therein, and a camera carrier positioned on the other end of said frame adapted to bring a camera into register with said opening, the said focusing screen carrier and camera carrier being journaled to said frame by a locking hinge comprising a cylindrical opening in said main frame, a pair of cylindrical openings in said carrier, a sleeve passing through both thereof, a locking pin within said sleeve, held in a raised position by a spring, the said pin having cooperating register pins thereon releasable by pressure thereon.

References Cited in the file of this patent

UNITED STATES PATENTS

| Number | Name | Date |
| --- | --- | --- |
| 1,153,392 | Kajiwana | Sept. 14, 1915 |
| 1,528,239 | Baille | Mar. 3, 1925 |
| 1,973,542 | Shull | Sept. 11, 1934 |
| 2,511,355 | Luz | June 13, 1950 |